Oct. 10, 1944.  J. LOUMIET ET LAVIGNE  2,360,066
GAS PURIFICATION SYSTEM
Filed March 20, 1941   4 Sheets-Sheet 1

INVENTOR.
JEAN LOUMIET ET LAVIGNE
BY
ATTORNEYS

Oct. 10, 1944. J. LOUMIET ET LAVIGNE 2,360,066
GAS PURIFICATION SYSTEM
Filed March 20, 1941 4 Sheets-Sheet 2
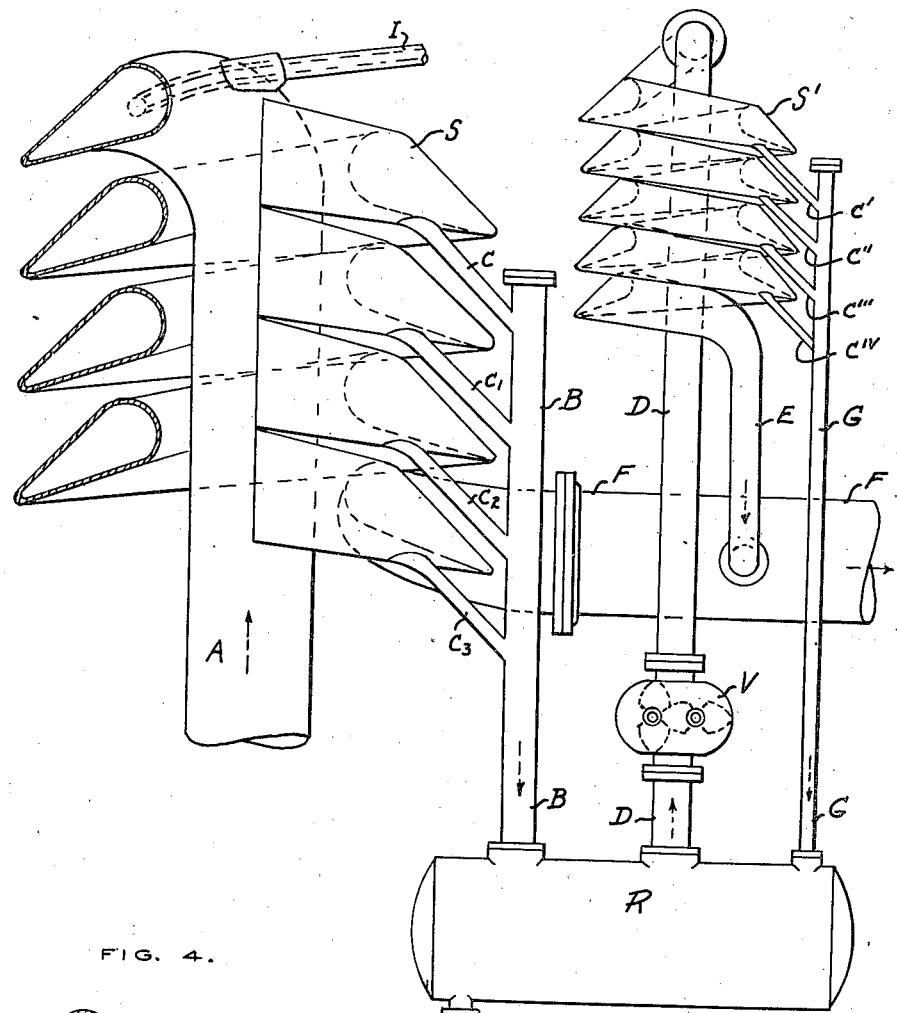
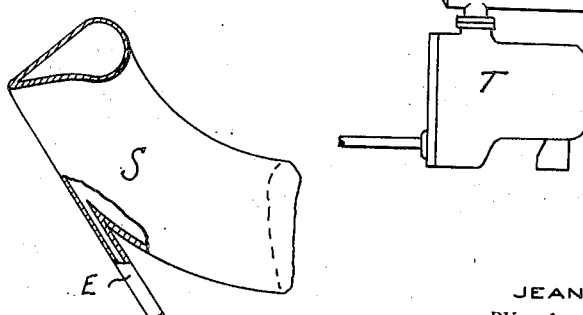
INVENTOR.
JEAN LOUMIET ET LAVIGNE
BY Moses and Nolte
ATTORNEYS Oct. 10, 1944.   J. LOUMIET ET LAVIGNE   2,360,066
GAS PURIFICATION SYSTEM
Filed March 20, 1941   4 Sheets-Sheet 3

INVENTOR.
JEAN LOUMIET ET LAVIGNE
BY *Moses and Nolte*
ATTORNEYS

Oct. 10, 1944. J. LOUMIET ET LAVIGNE 2,360,066
GAS PURIFICATION SYSTEM
Filed March 20, 1941 4 Sheets-Sheet 4
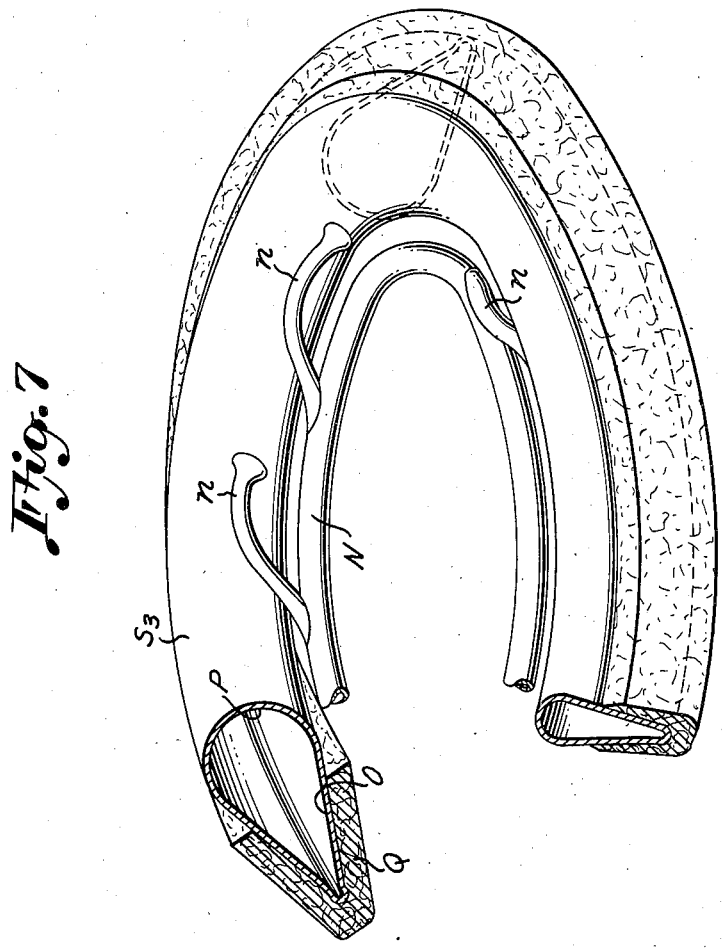
Inventor:
JEAN LOUMIET ET LAVIGNE
By Mosser and Nolte
Attorneys.

Patented Oct. 10, 1944

2,360,066

UNITED STATES PATENT OFFICE 2,360,066

GAS PURIFICATION SYSTEM

Jean Loumiet et Lavigne, Itabo, Cuba

Application March 20, 1941, Serial No. 384,364
In Cuba April 4, 1940

11 Claims. (Cl. 183—24)

The employment of centrifugal separators for the purification of vapors or gases from particles of small size, either solid or liquid, that they entrain is known; one form being illustrated in my previous invention disclosed in United States Patent #2,015,076. All such separators operate by causing the gas or vapor to circulate at great velocity inside a curved conduit, generally of helicoidal shape, where under the classifying action of centrifugal force the denser particles are located at the outer margin of the section of the conduit, being in that way separated from the principal stream of gas or vapor. Afterwards the impurities are extracted from such outer margin of the section, through tubes that convey them to chambers where they are deposited, when they are solid, or to traps permitting their evacuation, when they are liquid, without permitting waste of the gas or of the vapor.

The technic of these separations was improved by my separator, since its normal section presents, at its outer margin where the impurities are located, a restricted trough which collects them; and the evacuation is effected through extraction tubes that are connected tangentially to said restricted trough, so that inertia acts with full intensity to discharge the impurities into said collecting tubes.

Moreover, at the entrance of an extraction tube the restricted trough collecting the impurities to be removed is totally or partially obstructed by a diaphragm or vane preferably inclined to the radius of curvature of the conduit, so as to deflect the impurities collected by that restricted trough toward the extraction tube. This arrangement improves in practice the separation operation; but it has the inconvenience of increasing the resistance which the conduit presents to the motion of the circulating fluid, and in consequence increases also the loss of pressure required by the operation.

The several arrangements, the total or partial application of which constitutes the process of the invention, have for their object to improve the result of the separation effected inside of all such centrifugal separators. Such a new process will be described in its application to the separator of my invention; but it is, of course, also capable of being applied to any other centrifugal separator operating in the way previously described.

The first improvement which the process of the invention introduces consists in extracting through the extraction tube, simultaneously with the impurities separated in the restricted trough, a part of the gas or vapor circulating in said restricted trough. The advantages of this method are based on the discovery that when impurities alone are withdrawn the fluid passing the point of withdrawal develops local disturbances which interfere with the removal of the impurities; but, when a small portion of the fluid is withdrawn with the impurities, the fluid flow in the main channel tends to assist such withdrawal.

The process therefore improves considerably the results of each separation that the separator effects, and makes it possible to obtain a greater purification with a much smaller apparatus and also with much smaller loss of pressure in the treated fluid. It has however the inconvenience of separating from the main stream a part of the fluid itself at the same time as its impurities; but if it is considered that when operating on a fluid stream of great volume, that is, with separators of great dimensions, the quantity of the material diverted with the impurities does not exceed from two to three per cent of the total material, the saving of the new process becomes evident.

The small part of the fluid which entrains almost all of the impurities can really be subsequently purified from such impurities. The separator operating the second purification will, of course, be much smaller and cheaper; and, as to the loss of pressure, even if it may become more considerable, it only affects a small part of the diverted material, and in consequence, in terms of loss of mechanical work, it represents a much smaller quantity than the saving effected in the main supply.

In practice, the outflow through the extraction tube of the fluid which fills the restricted trough is secured by maintaining a lower pressure in the deposit chambers for the impurities than the pressure inside the coil. The pressure in the coil is, in turn, slightly variable along the same, so that the suction toward the deposit chamber for the impurities produced by that difference in pressure will be greater as the extraction tube is situated nearer the entrance to the coil.

When operating with steam at a higher pressure than the atmospheric pressure, the most simple and economical method is often to leave the trap serving as a deposit for the separated impurities slightly open at its upper part. In that way, the steam entrained by the extraction tubes is lost; but, since its proportion is insignificant, that loss does not affect the economy of the process, which is much simplified in that way.

In industries having multiple effect evaporators, as in sugar mills, for instance, the extraction traps for the impurities can be connected with the calandria of an evaporator in which the steam operates at a lower pressure than atmospheric pressure, thus creating a suction and permitting the application of the diverted steam to the heating of the calandria. The separator destined to purify that steam will be interposed between the trap and the calandria.

When operating to purify a gas as, for instance, coal gas, which has commercial value and which it is not convenient to let loose into the air by reason of the attending dangers, a blower will aspire the gas from the deposit chamber for the impurities and will return it to the entrance of the separator, impelling it through a complementary separator where its purification is effected. This arrangement permits regulation of the aspiration by means of the speed of the blower in order to adapt it to the needs of the purification.

The second improvement in the process is based upon the desirability of enlarging the particles of very small size that in great part form the impurities contained in the treated fluid, in order to facilitate their separation. The centrifugal force applied to these impurities is proportional to their mass, that is, to their volume. The greater the volume the less, proportionally to that volume, is the exterior surface of the particles, and in consequence the separating motion is much more easily effected.

The increase in volume of the particles of very small size forming the impurities is accomplished by bringing into the stream new liquids capable of being united with said impurities and of entraining them. When operating upon steam, the most simple process consists in leaving the conduit totally or partially uncovered, thus permitting the cooling of the steam and through that cooling a slight condensation of the same. Such condensation is produced preferably upon contact with the existing impurity particles that constitute a first solid or liquid nucleus present in the stream of steam, which the condensation has a tendency to increase.

If the cooling is effected only at the interior of the conduit in relation to its center of curvature, the remainder of the section being insulated, the condensation is produced at the interior; and since the drops of water that are produced in that way are impelled by centrifugal force toward the exterior of the section they constitute something like a slight rain which goes through the stream of treated steam, washing it. When instead of steam a gas is treated, coal gas for instance, the injection can consist of water, steam, or water entrained by a stream of steam in the manner of an injector.

When the injection consists of steam, it is convenient to cool the separating coil subsequently in order to obtain total condensation of the steam, and so that such condensation may facilitate the elimination of the impurities in the treated gas. In the particular case of coal gas, the injection can also be made with water when the gas is at a high temperature, the water being transformed into steam and such steam being again liquefied subsequently by cooling before or during the separation.

Instead of water, other liquids can sometimes be employed. For example, if it is a question of separating from a stream of natural gas the naphthas or gasolines it may contain, instead of water there can be employed carbides of greater density than the naphthas, gas oil for instance. Such gas oil can dissolve and carry along the liquid carbides and part of the gases that the stream may contain; and such carbides will be subsequently separated from the same by distillation. In a similar way many industrial wastes carried by gases or by air can be recovered, treating such gases in centrifugal separators; in which separation cases it may be advantageous to inject into such gases, previous to the separation operation or during that operation, liquids capable of carrying or dissolving said wastes.

The separators themselves can preferably be adapted to the new process; for which, instead of effecting the extraction of the impurities through tubes that are connected with the restricted collecting trough where such impurities have been inclosed, by centrifugal force, such tubes may be the prolongation of the outward end of the restricted trough, and the separator may be limited to the remainder of the section at the place of connection. By reason of this arrangement the section of the separator at the place of connection is divided into two parts, an outer part which constitutes a section of the extraction tube and extends tangentially from the separator; and the remainder of the section which constitutes a new section of the separator.

The separator can in that case be constructed with an original very deep restricted trough and the depth is diminished at each point of extraction by the subtraction of the outer end of the restricted trough which is embodied in the extraction tube, so that at the end of the separator said restricted trough disappears entirely; or else, the restricted trough can be made of small depth and be totally absorbed by the first extraction tube, and subsequent to that extraction the section of the separator is gradually modified in a way to progressively create a new restricted trough of the same shape, which will, in turn, be absorbed by the following extraction tube. Intermediate solutions between the two extremes that have been pointed out, can also be used.

In the accompanying drawings:

Figure 1 represents the application of the separator to the purification of the oils entrained by the exhaust steam of a steam engine, which it is desired to employ in heating a multiple effect evaporating apparatus as in sugar mills.

Figure 2 represents the application of the same separator to the purification of a stream of gas.

Figures 4, 5 and 6 represent several advantageously applicable ways for the construction of the separator in its attachment to the extraction tubes.

Figure 7 shows in perspective and on a larger scale a portion of a separator coil with insulation along its outer peripheral section.

Figures 1, 6:
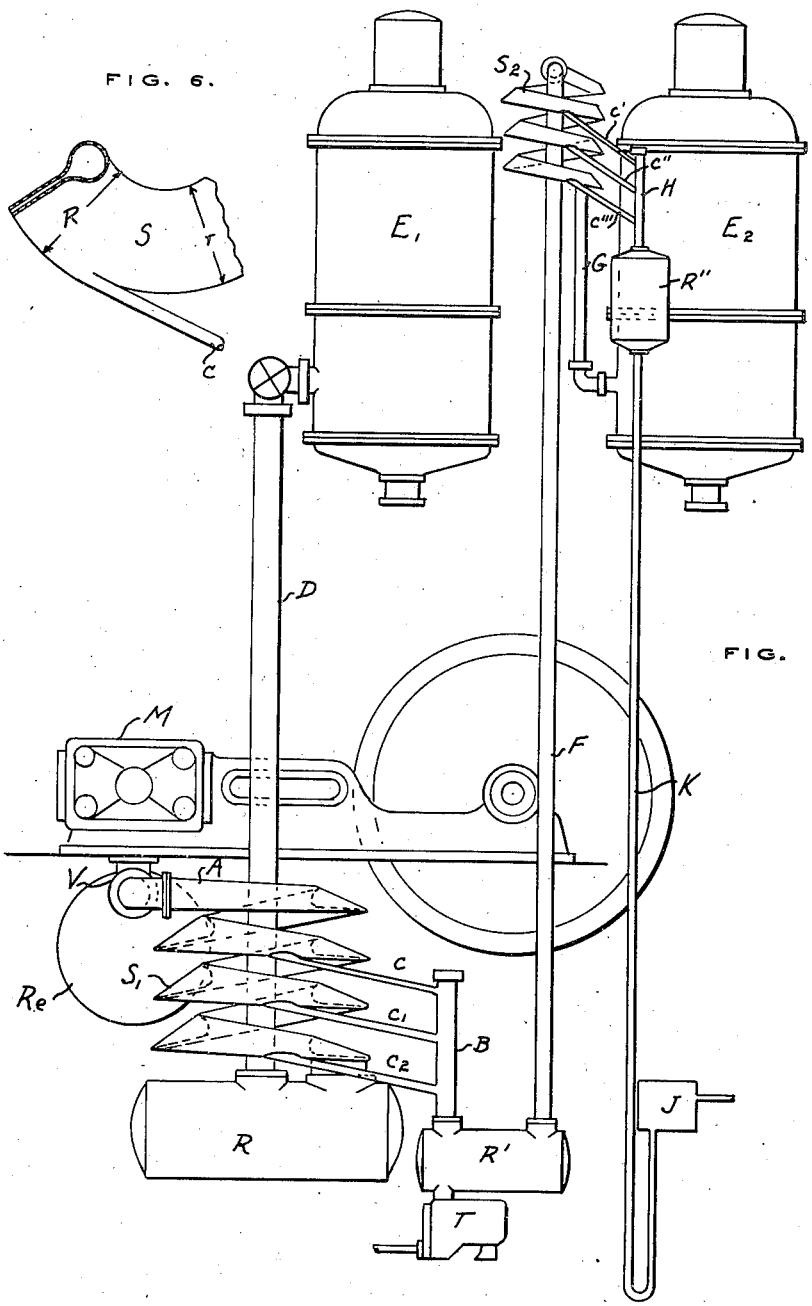
Figure 5:
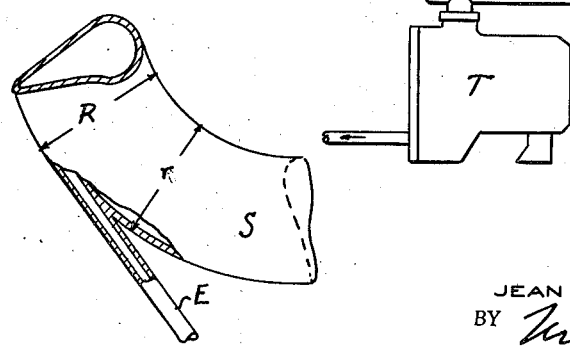

Referring to Figures 4, 5 and 6, they represent longitudinal sections of the separating coil S at the place of attachment of an extraction tube E. In Figure 4 tube E is tangentially attached without changing the section of the separator. In Figure 5 tube E prolongs the outward end of the impurities collecting restricted trough while coil S starts from the attachment with a reduced section by reason of the subtraction of the outer end of the restricted collecting trough. This second arrangement has the advantage of connecting the outer end of the restricted trough more directly with the extraction tube, and it prevents the expansion of the circulating fluid and the variation of its velocity, because the total of the outflow sections is equal to the coil section.

In the arrangement of Figure 4, on the contrary, the outflow section increases slightly beyond the amount represented by the section of the extraction tube. In consequence this arrangement produces a slight expansion of the gas, a slight decrease in its velocity and a slight motion of the gas from the interior toward the exterior within the coil section. This motion is evidently favorable to the separation.

It must be understood that the differences above pointed out between the figures take it for granted that the velocity of the fluid in tube E is equal to the velocity of the fluid in coil S; but it will be convenient, in practice, to increase the velocity in tube E and thus to create a suction increasing the efficiency of the separation.

Figure 6 represents an arrangement similar to that of Figure 5, with the difference that the extraction tube E forms a small funnel at the point of attachment, thus increasing the entrance section of the fluid into that tube at the expense of the section of the coil. The corresponding contraction of the separator's section, followed by the expansion of that section toward the exterior, produces the phenomena pointed out in relation to Figure 4 in a more prominent way than in the arrangement shown in that figure. Besides, the funnel facilitates notably the entrance of all the fluid contained in the outer extreme part of the restricted trough into the extraction tube.

The inconvenience of this arrangement consists in that it increases the resistance offered by the separator to the motion of the fluid and results a loss of pressure of said fluid in its course through the coil. According to the particular conditions of the separation to be accomplished, one or another of those arrangements can prove to be more advantageous.

The arrangements mentioned can be applied to all the separations effected by centrifugal separators, even if with less efficiency if there does not exist in those separators a collecting restricted trough for the impurities separated by centrifugal force. Particularly are they capable of being applied to all the separations effected in the separator of my Cuban Patent No. 10,388 and they have been especially studied for that application. In consequence, they can also be indifferently applied to the separation cases represented in Figures 1, 2 and 3, the first one being for purification of the exhaust steam of a steam engine by means of extraction of the oils it may entrain, on the supposition that this exhaust steam is to be applied to the heating of a multiple effect evaporating apparatus as in sugar mills. The second and third one for the purification of a stream of gas by means of extraction of the tars, oils and water that it may carry in suspension.

Going back to Figure 1, the steam passes out of steam engine M through tube V and enters tank $R_e$ which constitutes a chamber the function of which is to lessen the variations that the intermittent character of the engine's exhaust would produce in velocity both in the separator and in the tubing from the same. Upon passing out of said tank $R_e$, the steam enters through tube A the separator $S_1$ made up of three turns. Upon passing out of such separator, the steam is conveyed by tube D to the calandria of the first unit of the evaporating apparatus. In the figure, there has been interposed between the separator $S_1$ and the tube D a second steam chamber R which it will generally be possible to omit.

The extraction tubes of the separator $S_1$, $c$, $c_1$ and $c_2$ convey to chamber R' the impurities separated in the extreme exterior restricted trough of such separator together with the steam surrounding them. Such streams are united in tube B in order to enter chamber R' vertically; and by reason of their inertia the impurities that are denser than the steam are precipitated against the bottom of tank R' where they are united. Tank R' contains a valve, actuated by a float in a well known way used in steam traps, so that when the impurities extracted from the steam reach a given level in chamber R' said valve opens and empties out a good part of those impurities into the tank T. These impurities are thus emptied out periodically from tank R' into tank T; and they can be removed from tank T in order to recover the oil they may contain. The steam entering chamber R' through tube B goes out of the same through the tube F which conveys it through separator $S_2$ and tube G to the calandria of the second unit of the multiple effect apparatus. Since that calandria is under a notably lower pressure than the pressure of the separator, the regulation of the effect of such reduced pressure is effected by means of a valve (not shown) placed in tube G.

In the figure, tube F and the separator $S_2$ have been drawn on a larger scale than the rest of the drawing in order to avoid too small dimensions that would make difficult the execution of the drawing and its understanding. In practice, the dimensions of the separator $S_2$ will be at least six times smaller than those of separator $S_1$, and also the dimensions of the tube F, will hold about the same proportion to those of the tube D.

Separator $S_2$ can be of a greater number of turns than separator $S_1$, although, in the figure, it only appears as made up of three turns. It works, according to the figure, without the diversion of any part of the stream of steam toward chamber R'' for depositing the impurities separated. These impurities separated in said chamber keep filling the tube K situated at the bottom of that chamber and discharge through a U shape section into the tank J, situated at a lower level sufficiently low so that the difference in height compensates the vacuum existing in the calandria of the second unit of the evaporating apparatus. By reason of the height of chamber R'', the impurities go out freely through tank J from the moment at which tube K becomes nearly full.

My invention may also be applied to the second separator $S_2$ by connecting the chamber R'' with the final condenser of the apparatus or with the calandria of the third effect of such apparatus.

The thermal insulation of the separator has not been shown in the figure. If such insulation is not used, then the apparatus of the figure also utilizes the second improvement of my invention by the production of water condensation, thereby assisting in the entrainment of the impurities contained in the steam. Also, as has been pointed out, such thermal insulation can be limited to a part of the separator, leaving preferably without insulation the surface nearer to the center of curvature. This will cause localized condensation adjacent the inner face of the fluid path, and the resulting droplets will be propelled by centrifugal force across substantially the entire path of the fluid, exerting a washing action and effectively entraining minute solid particles. It is convenient, in any case, to insulate the last turn of the separator.

Figure 2 represents the application of my invention to the purification of a gas. Said gas enters the separator S through tube A. It then runs through the separator, which has been shown with four turns, and goes out of the same through the tube F. The streams of gas diverted by extraction tubes $c$, $c_1$, $c_2$ and $c_3$ are united in vertical tube B which conveys them to collection chamber R for impurities. In said chamber the impurities settle to the bottom, being of greater density, and hence pass intermittently to tank T, from which they are removed.

A blower V draws the gas from chamber R and sends it to a second separator S'. At its exit from that separator the gas is conveyed through tube E to tube F where it is combined with the principal supply of the same gas already purified. Extraction tubes $c'$, $c''$, $c'''$ and $c^{IV}$ of separator S' convey the diverted streams and the separated impurities to tube G which in turn leads them to the chamber R.

In the installation represented by the figure, the second improvement brought about by my invention in the application of centrifugal separators is carried into practice by the injection of atomized water into the treated gas, which is effected by the tube I. The special arrangement by which the water is atomized at its exit from tube I has not been shown; and any known process can be used in order to accomplish such atomization.

In Figure 7 is shown a portion of the helicoidal coil of a separator $S_3$ provided at its outer peripheral section O with a heat insulating covering Q, while its inner peripheral section or face P is free from such insulation. Steam is injected into the coil of the separator $S_3$ through the inner face P thereof by means of a header tube N, which runs along the length of said coil, and which is joined to said coil at intervals by means of branch pipes $n$ connecting into said inner coil face P. These branch pipes $n$ extend in a direction to inject the steam substantially tangentially of the inner face of the separator coil.

As the steam is injected in the inner face section P of the coil of the separator $S_3$, this steam will condense, since said inner face section is free from insulation, and will be projected by centrifugal force across substantially the entire section of the helicoidal passage defined by said coil $S_3$ to wash the gas and entrain impurities therein.

Figure 3:
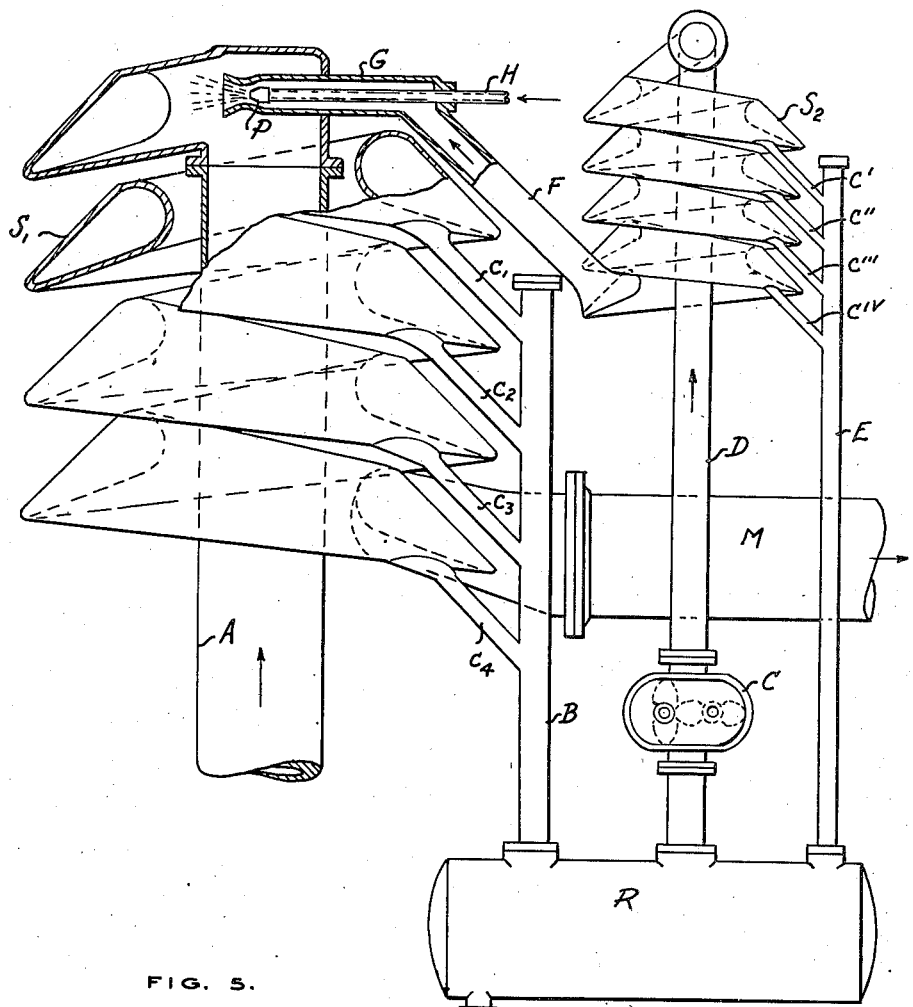
Figure 3 represents another application of the same separator to the purification of a stream of gas.

Figure 3 represents a second application of my invention to the purification of a gas. The treated gas passes through tube A into separator $S_1$, is purified in the four turns of that separator and goes out through tube M. The streams diverted from the gas through the extraction tubes $c_1$, $c_2$, $c_3$ and $c_4$ are conveyed by tube B to tank R where the greater part of the impurities that they may entrain are deposited, being removed from that tank at intervals and placed in tank T.

The suction from tank R is produced by blower C which impels the gas through separator $S_2$ and tube F to the entrance of the separator $S_1$. The suction of the streams of gas that are diverted with their impurities from the supply circulating in separator $S_2$ is produced by the same blower C, since the extracting tubes of such streams $c'$, $c''$, $c'''$ and $c^{IV}$ connect by means of tube E with tank R. The stream purified in separator $S_2$ is conveyed by tube F to chamber G where it is used to atomize, in atomizer P, the liquid to be injected into the stream of gas being treated in $S_1$ and entering through tube H.

The arrangement shown in the figures deal with specific cases. When the case varies, those arrangements can also vary. For example, in the purification of an exhaust steam from a steam engine of lower pressure than atmospheric pressure, the separator will be situated between the engine and the condenser; and the entrainment of the vapors that are to be separated will be effected, either through the vacuum which might be caused by a small complementary condenser operated at a lower temperature and with a greater vacuum than the main condenser, or else by forcing the diverted streams through their separator in the general condenser by means of a steam injector, a blower or any other known means.

In all the arrangements that I have thus far described, the successive streams carrying impurities diverted from the main stock are united in order to be free jointly from the impurities they may entrain. But the first entraining stream contains many more impurities than the second one; the second one contains more impurities than the third one; and thus the successive diverted streams are each time purer. In consequence it may be deemed more logical that each of those streams be purified separately, thus preventing that when joining them in order to purify them jointly, the first of those streams contaminate the others. This arrangement is the more logical as the pressure at the connection of the extraction tube of the first of the streams is higher than at the connection of the second one; and in consequence, while maintaining the same velocity, it permits the employment of a separator with a greater number of turns for the first diverted stream which is also more impure.

The difference of pressure existing between two successive connections is the greater the more distant those connections are. In consequence, it will be convenient in several cases to space the connections so as to create a substantial difference in pressure between the connections of two successive extraction tubes, and to purify each diverted stream separately, applying to the purification of these streams a secondary separator proportionally larger the nearer the extraction tube of that stream is to the entrance of the main separator.

The most convenient solution must be determined in accordance with the case under consideration.

I have described what I believe to be the best embodiments of my invention. I do not wish, however, to be confined to the embodiments shown but what I desire to cover by Letters Patent is set forth in the appended claims.

I claim:

1. Apparatus for the purification of a stream of gas which comprises a helicoidal separation passage for the stream, having a collection channel of reduced diameter extending along its outer side, arranged to receive impurities impelled outwardly by centrifugal force and to form a fluent stream carrying the impurities; a plurality of discharge passages for impurities connected at spaced points with the channel; a separator for gas and impurities connected to the discharge ends of said withdrawal passages; a purification device having an inlet connected to the gas discharge from said separator, and a gas discharge from the purification device discharging into the stream of gas passing through the separator.

2. Purification apparatus as set forth in claim 1 adapted for purifying steam in advance of a device utilizing steam at lower pressure, which comprises a discharge trap having an inlet connected to the impurities discharge from the purification device and provided with a gas outlet connected to said lower pressure device.

3. Apparatus for the purification of a stream of gas which comprises a helicoidal passage for the stream arranged to propel impurities in the stream by centrifugal force into the outer portion of the passage, discharge passages for the impurities connected to said outer portion at intervals, and a liquid atomizer discharging into the passage adjacent the inner face thereof, the arrangement being such that the liquid particles projected into the stream of gas in the passage are projected outwardly by centrifugal force across substantially the entire section of the passage to wash the gas and entrain impurities therein.

4. Purification apparatus as set forth in claim 3 in which the injector is of the gas pressure operated type, and the gas is discharged into the helicoidal passage.

5. Apparatus for the purification of a stream of gas which comprises a helicoidal separating passage for the stream of gas arranged for propulsion of impurities by centrifugal force toward the outer face of the path, discharge passages for the impurities and a portion of the gas connected to said outer face at intervals, a separator for the impurities and gas connected to said discharge passages, an injector of washing liquid discharging into the passage, a gas passage connecting a gas outlet from the separator to the injector, and a blower in the gas passage arranged to withdraw the gas from the separator and to supply gas under pressure to the injector.

6. Apparatus for the purification of a stream of exhaust steam from a steam engine prior to introduction into a condenser operated at a higher vacuum than a steam engine condenser which comprises a helicoidal separation passage for the stream arranged for propulsion of impurities by centrifugal force towards the outer face of the passage, a plurality of discharge passages connected to said outer face at intervals, a gravity separator for said impurities and entrapped steam connected to said passages, and a steam discharge passage connecting the steam outlet of the separator with said higher vacuum condenser, the arrangement being such that the latter condenser serves to draw the impurities and steam from the separation passage.

7. Apparatus for the purification of a stream of exhaust steam from a steam engine prior to introduction into a condenser which comprises a helicoidal separation passage for the stream arranged for propelling impurities by centrifugal force towards the outer face of the passage; a plurality of discharge passages for impurities and entrapped steam connected at intervals to the separation passage along said outer face; a gravity separator for said steam and impurities connected to the discharge passages, said separator having separate outlets for steam and impurities; a steam discharge passage connecting the steam outlet of the separator with the condenser, and a propelling device in the latter passage arranged to force the steam from the separator into the condenser.

8. Apparatus for the purification of engine exhaust steam for use in heating a multiple effect evaporator, comprising a main helicoidal separation passage for a current of said steam arranged for propulsion of impurities toward the outer face of the passage; a steam passage connecting the discharge end of the main passage with the first effect of the evaporator; a plurality of discharge passages for impurities connected to the separation passage along said outer face at intervals; a separator for impurities and steam connected to said impurities discharge passages and having separate outlets for steam and impurities; an auxiliary helicoidal separation passage connected to the steam outlet from the separator and discharging into a later operating effect of said evaporator; a plurality of impurities discharge passages connected to the auxiliary passage along its outer face, and a receiver for impurities connected to the latter discharge passages.

9. Apparatus for the purification of engine exhaust steam for use in heating a multiple effect evaporator, comprising a main helicoidal separation passage for a current of said steam, arranged to propel impurities toward the outer face of the passage; a plurality of discharge passages for impurities connected at intervals to said passage along its outer face; a separator for steam and impurities connected to said discharge passages and having separate outlets for steam and impurities; a steam discharge passage connected to the steam outlet of the separator and discharging into said current of steam, said steam discharge passage including an auxiliary helicoidal separation passage arranged to propel impurities toward the outer face of the passage; an impurities discharge passage connected to said outer face of the auxiliary helicoidal passage, and a steam propelling device located in said steam discharge passage and generating steam discharge pressure at least equal to the pressure of said steam current.

10. Purification apparatus as set forth in claim 9 including an injector for washing liquid discharging into the steam current in the main helicoidal passage, said injector being connected to said steam discharge passage and operated by the steam under pressure from the latter passage.

11. An apparatus for purifying a stream of gas which comprises a helicoidal passage for the stream arranged to propel impurities in the stream by centrifugal force into the outer portion of the passage, discharge passages for the impurities connected to said outer portion at intervals, and a steam injection device for discharging steam into said helicoidal passage adjacent the inner face thereof, said inner face being free from insulation while the rest of the helicoidal passage is insulated, whereby steam from said injection device is condensed in said inner face and impelled therefrom by centrifugal force across substantially the entire section of said helicoidal passage to wash the gas and entrained impurities therein.

JEAN LOUMIET ET LAVIGNE.